Figure 1:
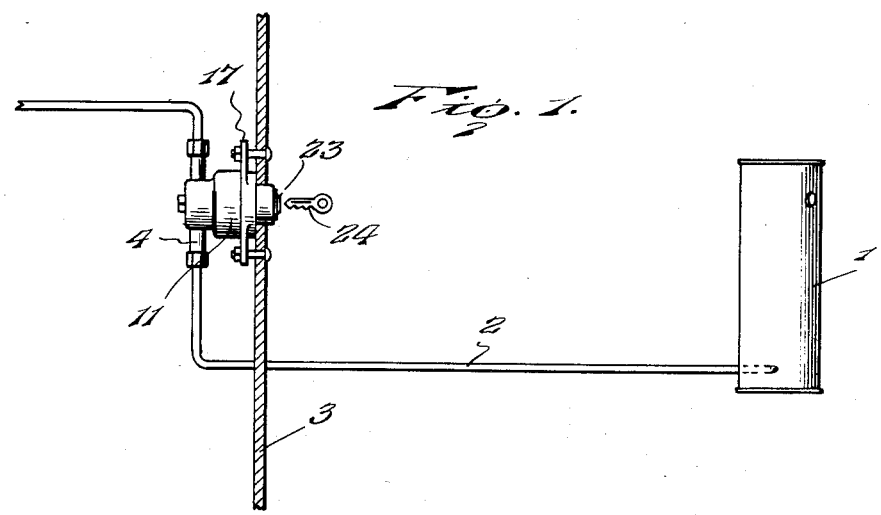

June 25, 1935.    S. MOORE    2,006,027
FUEL VALVE LOCK FOR MOTOR VEHICLES
Filed July 6, 1933    2 Sheets-Sheet 1

Inventor
Samuel Moore.
By Lacey & Lacey, Attorneys

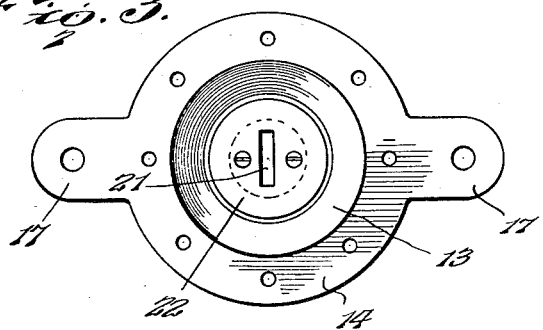
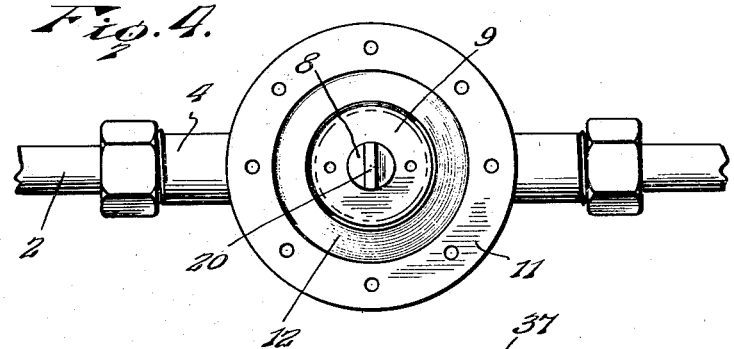
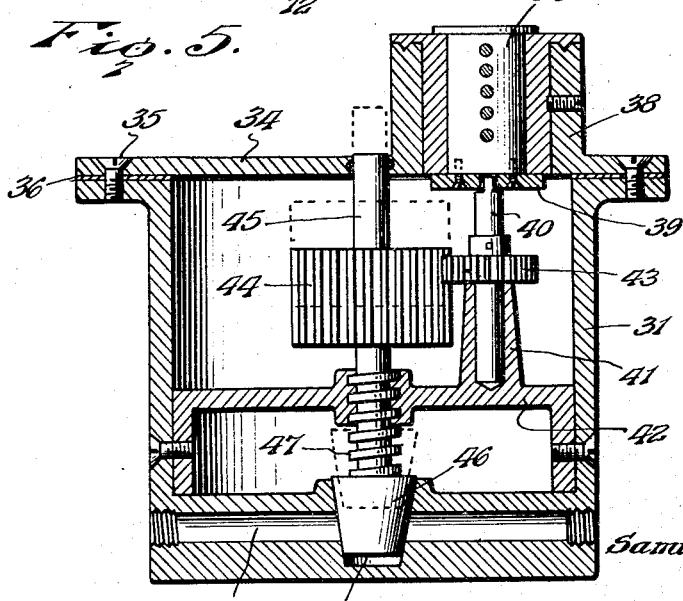

Patented June 25, 1935

2,006,027

UNITED STATES PATENT OFFICE 2,006,027

FUEL-VALVE LOCK FOR MOTOR VEHICLES

Samuel Moore, Cleveland, Ohio, assignor of thirty-three and one-third per cent to Roger Price and thirty-three and one-third per cent to William Pierson, Cleveland, Ohio Application July 6, 1933, Serial No. 679,245

1 Claim. (Cl. 251—6)

It is a frequent practice with mischievous persons or evilly disposed persons to take unauthorized use of motor vehicles and operate the same with resultant damage to the vehicle as well as the loss of its use by the owner.

It is the object of the present invention to provide means whereby the flow of fuel from the supply tank to the carburetor may be prevented so that the owner of a car, by locking the fuel line, may leave the car unattended without fear of its being stolen or used without his permission.

The invention is illustrated in the accompanying drawings and consists in certain novel features which will herein first be fully described and then more particularly defined in the appended claim.

Figure 2:
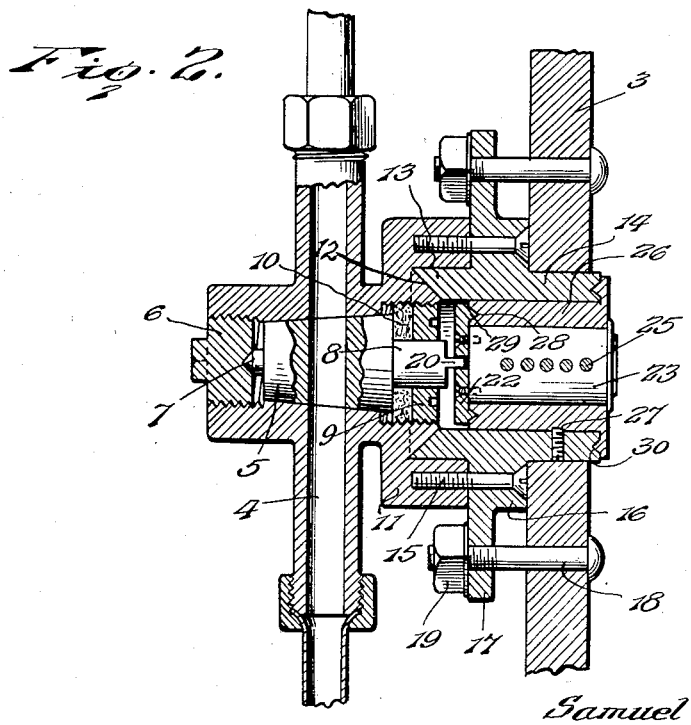

In the drawings,

Figure 1 is a diagrammatic elevation illustrating the application of the invention, Figure 2 is an enlarged section through the valve and the lock whereby the flow of fuel may be shut off, Figure 3 is an elevation of the lock case, Figure 4 is a similar view of the valve case, and Figure 5 is a view similar to Figure 2 and showing a modification.

In the drawings, the numeral 1 indicates the fuel supply tank, 2 indicates the pipe carrying the fuel to the carburetor and 3 designates the dash or instrument board of the vehicle. In carrying out the present invention, the fuel line or pipe 2 is interrupted at a point in front of the dash or instrument board and a coupling 4 is interposed in the pipe and connected with the separated ends of the same, as will be readily understood upon reference to Figure 2. The coupling 4 contains a valve chamber which is adapted to receive a turning plug valve 5 and is closed at its front end by a plug 6 which provides a bearing for a stud 7 on the smaller front end of the valve, as shown in Figure 2. At its rear end, the valve plug is formed with a reduced extension 8 of circular cross section which is rotatably received in a disk 9 which is threaded into an extension of the valve chamber and bears against packing 10 so that leakage around the valve and the extension or stud is prevented. It will be noted that on the rear side of the coupling 4 is formed an enlarged boss 11 and this boss is constructed with an annular groove 12 surrounding the valve chamber and the disk 9. The groove 12, shown most clearly in Figure 2, has one wall disposed parallel with the axis of the chamber and of the plug 5 while its inner wall is disposed at an angle to said axis and to the outer wall whereby the groove is tapered and is adapted to receive a wedge-shaped annular rib 13 on the front side of a lock case 14 which is secured to the boss by bolts or screws 15 inserted through an annular flange 16 on the case and engaged in openings provided therefor in the enlarged boss, as clearly shown. The lock case is provided with a second flange 17 and securing bolts 18 are inserted through the dash or instrument board 3 and said flange 17 to receive securing nuts 19 which are turned home toward the front side of the flange whereby the lock case is secured in position. It will be seen at once that access to the lock case cannot be had from the passenger compartment of the vehicle and can only be obtained through the compartment containing the power plant which makes the operation somewhat difficult for persons who are perforce working hurriedly.

The stud or extension 8 of the valve plug is provided at its rear extremity with a diametrical rib 20 which is adapted to seat in a corresponding notch or socket 21 in the front side of a disk 22 which is secured to the end of a lock cylinder 23. The cylinder 23 is of the usual cylinder lock type and is controlled by a key, indicated at 24, which will fit only the particular lock for which it is intended. The detailed construction of the lock is not illustrated inasmuch as, in itself, it forms no part of the present invention and may be varied at will. Pin tumblers 25 are indicated in Figure 2 merely to conventionally indicate the type of lock which I prefer to use. The cylinder 23 is rotatably mounted in a sleeve or barrel 26 which is fitted in the lock case and is held against turning movement by a set screw 27 mounted radially in the lock case and engaging a notch provided therefor in the side of the barrel. The forward end of the barrel 26 is formed with a V-shaped annular groove 28 which is engaged by a correspondingly shaped annular rib 29 on the rear face of the disk 22 so that a good ground joint will be formed between these elements and leakage of gasoline or other fuel will be guarded against. The rear end of the lock case is also provided with a V-shaped annular groove which is engaged by a V-shaped annular rib on the flange of the barrel 26, as indicated at 30, so that the barrel is effectually sealed with respect to the lock case and also with respect to the lock cylinder.

It will be understood from the foregoing description that when the vehicle is not in use, the key 24 is inserted in the lock cylinder and the cylinder is rotated which will, in turn, rotate the valve plug 5 so that the port therethrough will be disposed transversely to the bore of the coupling 4 and consequently the flow of fuel will be cut off. When the flow is thus cut off the key is withdrawn and consequently the valve remains locked in the closed position.

In Figure 5 I have shown a variation in the application of the invention in which the coupling, to connect the ends of the severed fuel line, is provided by the end of a casing or bracket 31 having a passage 32 therethrough into which the ends of the fuel line are threaded, a tapered valve seat 33 being formed in the end wall of this bracket or casing and passing across the passage 32, as shown. The casing or bracket is secured to a plate 34 by cap screws 35 and a suitable gasket 36 is interposed between said plate and the flange of the bracket. The lock 37 is mounted in a boss 38 formed on the plate 34 and is equipped with a disk 39 receiving a stem 40 just as the disk 22 receives the stem or rib 20 in the first described form of the invention. In the arrangement shown in Figure 5, the stem 40 is elongated and is rotatably mounted in a boss 41 formed on the forward side of a plate 42 which is secured within the casing or bracket 31 in any approved manner. A pinion 43 is secured upon the stem 40 at the rear of the bearing 41 and meshes with a wide gear 44 secured upon a shaft 45 which is journaled in the plate 34 and in the inner plate or bracket 42, the forward end of the shaft being secured to or formed integral with the tapered valve plug 46. The portion of the shaft immediately adjacent the valve has a coarse thread 47 formed thereon which threads engage a corresponding mating thread formed in the bearing provided for the shaft in the plate 42, as clearly shown. It will now be understood that when the lock cylinder 37 is turned in one direction the shaft 45 will be rotated so that the threaded engagement between the shaft and its bearing in the plate 42 will cause the valve plug to ride into close engagement with its seat and thereby cut off the flow of fuel, while the rotation of the lock cylinder in the opposite direction will cause the shaft to turn so that the valve will move from its seat and re-establish the flow of the fuel.

In both forms of the invention the valve and its locking mechanism are located on the front side of the instrument board or dash of the vehicle so that they will be protected from possible danger from chance blows and will also be practically inaccessible to unauthorized persons. When the valve is closed and locked the flow of fuel is positively cut off so that unauthorized persons will not be able to use the vehicle.

Having thus described the invention, I claim:

A valve having a casing including a cylindrical body open at one end, a valve plug rotatable in said body and having a neck projecting from the open end thereof, a cup-shaped boss surrounding said body in spaced relation to the open end thereof, the marginal wall of which projects beyond the open end of the body, the portion of the body projecting into the boss having its outer peripheral surface beveled to form a transversely tapered groove with the boss about the body, a disk threaded into the open end of the body and fitting snugly about the neck of the valve plug, packing means provided between the disk and body of the valve plug to form a tight joint, a cylindrical lock case having the inner end portion thereof fitting snugly into the boss and being internally beveled from its inner end to conform to and fit snugly within the groove, an annular flange surrounding said case and abutting the outer edge face of the marginal wall of the boss, fasteners for detachably securing the flange to said wall, the outer end portion of the neck of said valve plug extending into said lock case when the case is in place, a lock barrel fitted into said case through the outer end thereof and held against relative rotation therewith, a lock cylinder rotatably mounted in said barrel, and a disk at the inner end of said lock cylinder abutting the inner end of the barrel and engaging the neck of the valve plug to turn the valve plug when the lock cylinder is turned.

SAMUEL MOORE. [L. S.]